United States Patent
Paull

(10) Patent No.: US 9,828,894 B2
(45) Date of Patent: Nov. 28, 2017

(54) EXHAUST MANIFOLD COMPRISING AN EGR PASSAGE AND A COOLANT PASSAGE

(71) Applicant: Deere & Company, Moline, IL (US)

(72) Inventor: Adam J Paull, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 446 days.

(21) Appl. No.: 14/078,774

(22) Filed: Nov. 13, 2013

(65) Prior Publication Data

US 2015/0128921 A1    May 14, 2015

(51) Int. Cl.
| | |
|---|---|
| *F01N 3/04* | (2006.01) |
| *F02M 26/22* | (2016.01) |
| *F01N 13/10* | (2010.01) |
| *F02M 26/15* | (2016.01) |

(52) U.S. Cl.
CPC ............. *F01N 3/043* (2013.01); *F01N 13/10* (2013.01); *F02M 26/15* (2016.02); *Y02T 10/20* (2013.01)

(58) Field of Classification Search
CPC .... F02M 25/0715; F02M 26/05; F02M 26/06; F02M 26/43; F02M 35/10222; F02M 26/21; F02M 26/00; F02M 26/28; F02M 26/23; F02M 26/24; F02M 26/22; F02M 26/25; F02M 26/29; F02D 41/005; F02D 41/0047
USPC ................. 123/676; 60/278, 605.2, 321–323
See application file for complete search history.

(56) References Cited

U.S. PATENT DOCUMENTS

| | | | |
|---|---|---|---|
| 4,179,884 A | 12/1979 | Koeslin | |
| 4,187,678 A | 2/1980 | Herenius | |
| 4,195,605 A * | 4/1980 | Weathers | ................ F02D 37/02 123/568.29 |
| 4,267,812 A * | 5/1981 | Aula | ....................... F02B 47/08 123/184.33 |
| 4,924,840 A * | 5/1990 | Wade | ..................... F02D 21/08 123/568.19 |
| 6,213,074 B1 * | 4/2001 | Freese | ..................... F02B 75/22 123/195 C |

(Continued)

FOREIGN PATENT DOCUMENTS

| | | |
|---|---|---|
| CN | 201535209 U | 7/2010 |
| DE | 102007053126 A1 | 5/2009 |

(Continued)

OTHER PUBLICATIONS

German Search Report in foreign counterpart application No. 102014222725.9 dated Dec. 16, 2016 (9 pages).

*Primary Examiner* — Sizo Vilakazi

(57) ABSTRACT

Disclosed is an exhaust manifold that comprises an exhaust gas passage, an EGR passage, and a coolant passage. The exhaust gas passage extends fluidly between an exhaust gas inlet and an exhaust gas outlet positioned downstream thereof. The EGR passage extends fluidly between an EGR inlet and an EGR outlet positioned downstream thereof. The EGR inlet is defined by the exhaust gas passage. A coolant passage extends fluidly between a coolant inlet and a coolant outlet positioned downstream thereof. The coolant passage overlaps the exhaust gas passage and the EGR passage. The exhaust gas passage is configured to cool the exhaust gas, and EGR passage is configured to cool the recirculated portion of the exhaust gas.

17 Claims, 7 Drawing Sheets

(56) References Cited

U.S. PATENT DOCUMENTS

| | | | | |
|---|---|---|---|---|
| 7,845,338 B2* | 12/2010 | Smith | ................ | F02M 25/0728 |
| | | | | 123/568.12 |
| 2002/0023630 A1* | 2/2002 | Balekai | ................... | F02B 75/22 |
| | | | | 123/568.12 |
| 2005/0199227 A1* | 9/2005 | Juschka | ................ | F01N 3/0205 |
| | | | | 123/568.12 |
| 2006/0144040 A1 | 7/2006 | Westerbeke, Jr. | | |
| 2010/0089370 A1* | 4/2010 | Furukawa | .......... | F02M 25/0729 |
| | | | | 123/568.12 |
| 2011/0023843 A1* | 2/2011 | Ewen | ................ | F02M 25/0728 |
| | | | | 123/568.12 |
| 2012/0023935 A1* | 2/2012 | Pursifull | ............... | F01N 13/009 |
| | | | | 60/605.2 |
| 2012/0204845 A1* | 8/2012 | Gingrich | ................ | F02M 26/43 |
| | | | | 123/568.17 |
| 2012/0227714 A1* | 9/2012 | Surnilla | ................ | F02D 41/005 |
| | | | | 123/568.19 |
| 2013/0055970 A1* | 3/2013 | Harada | ..................... | F01P 3/20 |
| | | | | 123/41.79 |
| 2013/0167812 A1* | 7/2013 | Kurihara | ............ | F02M 25/0793 |
| | | | | 123/568.11 |
| 2013/0263828 A1* | 10/2013 | Cockerill | ............ | F02B 29/0418 |
| | | | | 123/540 |
| 2015/0128921 A1* | 5/2015 | Paull | .................. | F02M 25/0715 |
| | | | | 123/676 |

FOREIGN PATENT DOCUMENTS

| | | |
|---|---|---|
| DE | 102010048793 B3 | 11/2011 |
| DE | 102010051562 A1 | 5/2012 |
| EP | 1233170 A2 | 8/2002 |
| EP | 2077388 A2 | 7/2009 |
| JP | 20060132374 A | 5/2006 |
| JP | 2008163773 A | 7/2008 |
| JP | 20090108704 A | 5/2009 |
| JP | 20120082723 A | 4/2012 |
| JP | 20120082724 A | 4/2012 |

\* cited by examiner

EXHAUST MANIFOLD COMPRISING AN EGR PASSAGE AND A COOLANT PASSAGE

FIELD OF THE DISCLOSURE

The present disclosure relates to an exhaust manifold. Or more specifically, it relates to an exhaust manifold comprising an exhaust gas passage, an exhaust gas recirculation ("EGR") passage, and a coolant passage.

BACKGROUND OF THE DISCLOSURE

Manufacturers of nonroad diesel engines are expected to meet set emissions regulations. For example, Tier 3 emissions regulations required an approximate 65 percent reduction in particulate matter ("PM") and a 60 percent reduction in nitrogen oxides ("$NO_x$") from 1996 levels. As a further example, Interim Tier 4 regulations required a 90 percent reduction in PM along with a 50 percent drop in $NO_x$. Still further, Final Tier 4 regulations, which will be fully implemented by 2015, will take PM and $NO_x$ emissions to near-zero levels. Manufacturers of maritime engines are also expected to meet emissions regulations though they vary from the nonroad emissions regulations (e.g., International Maritime Organization regulations).

One technique for reducing $NO_x$ involves introducing chemically inert gas into the fresh intake gas for subsequent combustion. By reducing the oxygen concentration of the resulting charge to be combusted, the fuel burns slower and peak combustion temperatures are reduced, thereby lowering the production of $NO_x$. In an internal combustion engine environment, such chemically inert gases are readily abundant in the form of exhaust gas, and one known method for achieving the foregoing result is through the use of an EGR system operable to controllably introduce a recirculated portion of the exhaust gas, from the exhaust manifold, into an intake manifold.

SUMMARY OF THE DISCLOSURE

Disclosed is an exhaust manifold that comprises an exhaust gas passage, an EGR passage, and a coolant passage. The exhaust gas passage extends fluidly between an exhaust gas inlet and an exhaust gas outlet positioned downstream thereof. The exhaust gas passage—which allows exhaust gas, from an internal combustion engine, to pass therethrough—extends fluidly between an EGR inlet and an EGR outlet positioned downstream thereof. The EGR inlet is defined by the exhaust gas passage. The EGR passage allows a recirculated portion of the exhaust gas to pass therethrough. A coolant passage extends fluidly between a coolant inlet and a coolant outlet positioned downstream thereof, and it overlaps the exhaust gas passage and the EGR passage. The coolant passage cools the exhaust gas passage and the EGR passage via a coolant. The exhaust gas passage cools the exhaust gas, and EGR passage cools the recirculated portion of the exhaust gas.

BRIEF DESCRIPTION OF THE DRAWINGS

The detailed description of the drawings refers to the accompanying figures in which.

DETAILED DESCRIPTION OF THE DRAWINGS

Figure 1:
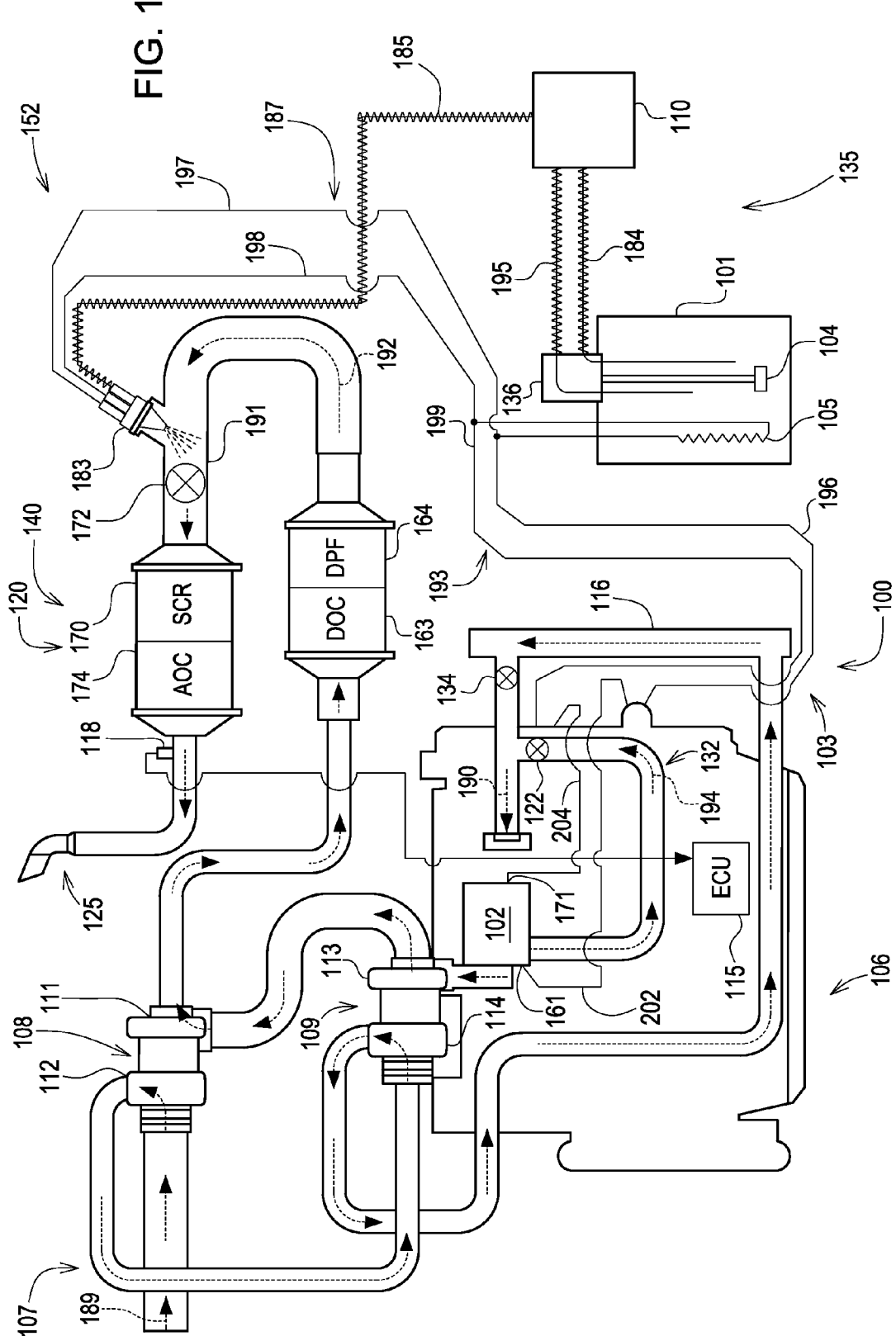
FIG. 1 is a simplified schematic illustration of a power system having a exhaust manifold.

Referring to FIG. 1, there is shown a schematic illustration of a power system 100 for providing power to a variety of machines, including on-highway trucks, construction vehicles, marine vessels, stationary generators, automobiles, agricultural vehicles, and recreation vehicles. The engine 106 may be any kind that produces an exhaust gas, as indicated by directional arrow 192. For example, engine 106 may be an internal combustion engine, such as a gasoline engine, a diesel engine, a gaseous fuel burning engine (e.g., natural gas), or any other exhaust gas producing engine. The engine 106 may be of any size, with any number cylinders (not shown), and in any configuration (e.g., "V," inline, and radial). The engine 106 may include various sensors, such as temperature sensors, pressure sensors, and mass flow sensors—some of which are shown in FIG. 1.

The power system 100 may include an intake system 107 that includes components for introducing a fresh intake gas, as indicated by directional arrow 189, into the engine 106. Among other things, the intake system 107 may include an intake manifold (not shown) in communication with the cylinders, a compressor 112, a charge air cooler 116, and an air throttle actuator 134.

The compressor 112 may be a fixed geometry compressor, a variable geometry compressor, or any other type of compressor that is capable of receiving the fresh intake gas from upstream of the compressor 112. The compressor 112 compresses the fresh intake gas to an elevated pressure level. As shown, the charge air cooler 116 is positioned downstream of the compressor 112, and it cools the fresh intake gas.

The air throttle actuator 134 may be positioned downstream of the charge air cooler 116, and it may be, for example, a flap type valve controlled by an electronic control unit ("ECU") 115 to regulate the air-fuel ratio. The air throttle actuator 134 is open during normal operation and when the engine 106 is off. However, in order to raise the exhaust temperature prior to, and during, active exhaust filter regeneration, the ECU 115 progressively closes the air throttle actuator 134. This creates a restriction, causing the exhaust temperature to increase. The ECU 115 receives position feedback from an internal sensor within the air throttle actuator 134.

Further, the power system 100 includes an exhaust system 140, which has components for directing exhaust gas from the engine 106 to the atmosphere. The exhaust system 140 may include an exhaust manifold 102 in fluid communication with the cylinders. During an exhaust stroke, at least one exhaust valve (not shown) opens, allowing the exhaust gas to flow through the exhaust manifold 102 and a turbine 111. The pressure and volume of the exhaust gas drives the turbine 111, allowing it to drive the compressor 112 via a shaft (not shown). The combination of the compressor 112, the shaft, and the turbine 111 is known as a turbocharger 108.

Figure 2:
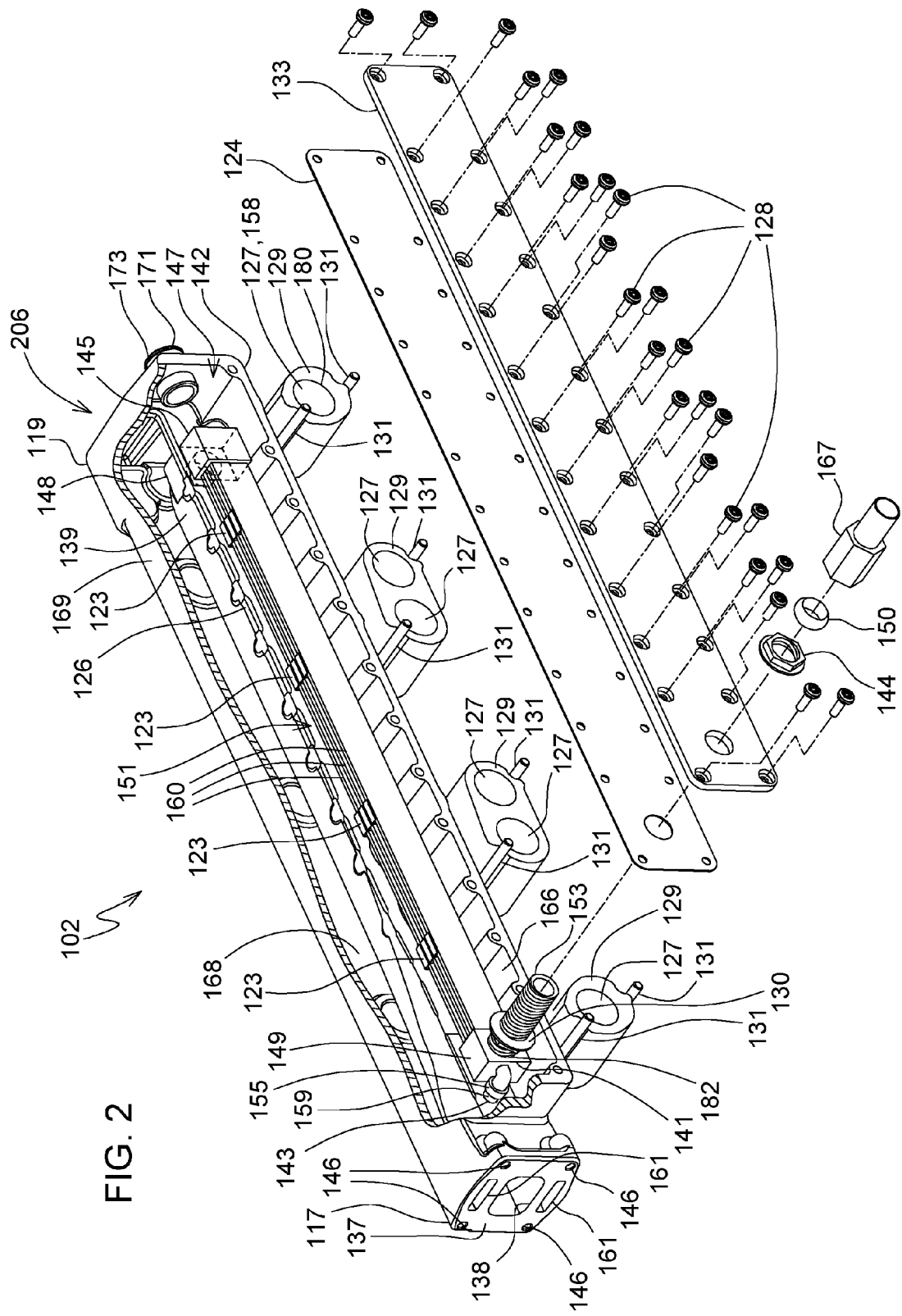
FIG. 2 is a perspective view of the exhaust manifold, a portion of which is broken away, having a an exhaust gas passage, an EGR passage, and a coolant passage.
Figure 3:
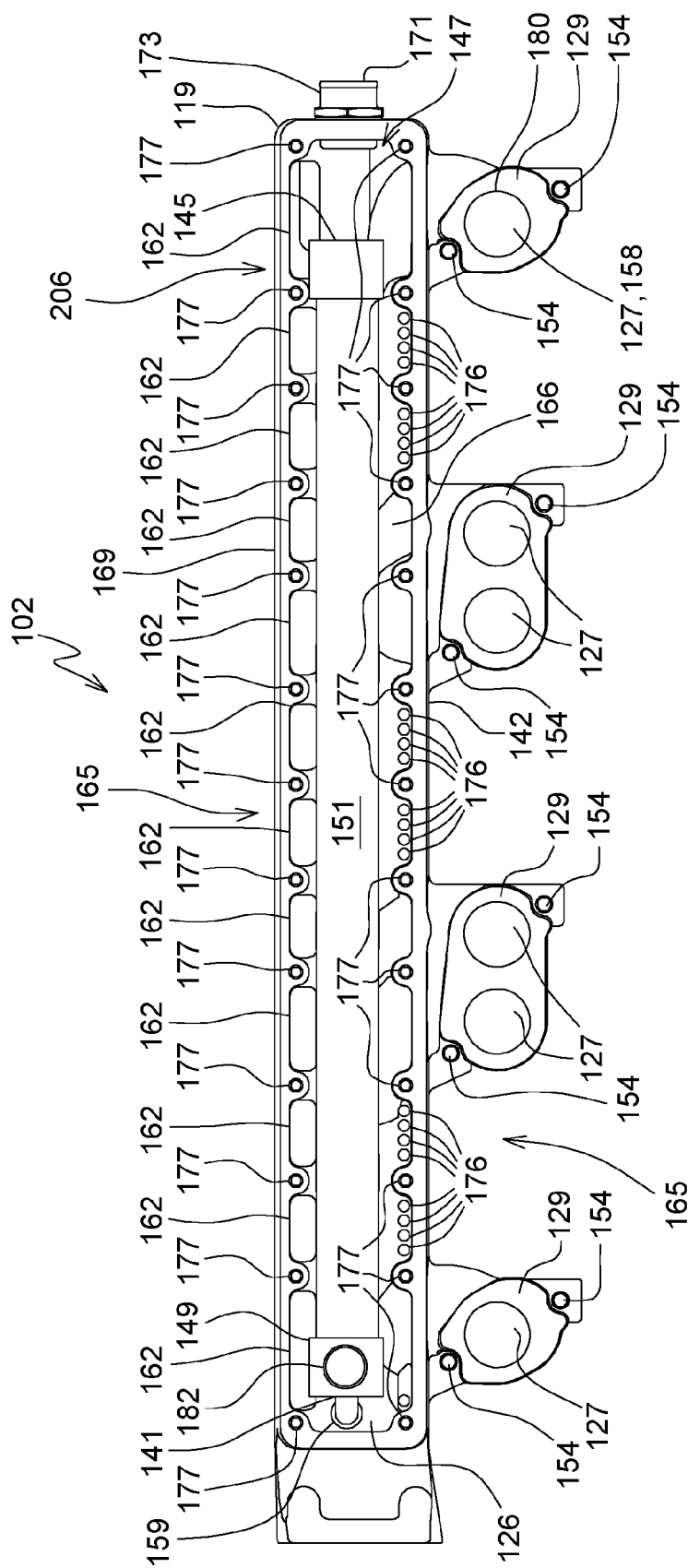
FIG. 3 is a side elevation view of the exhaust manifold.
Figure 4:
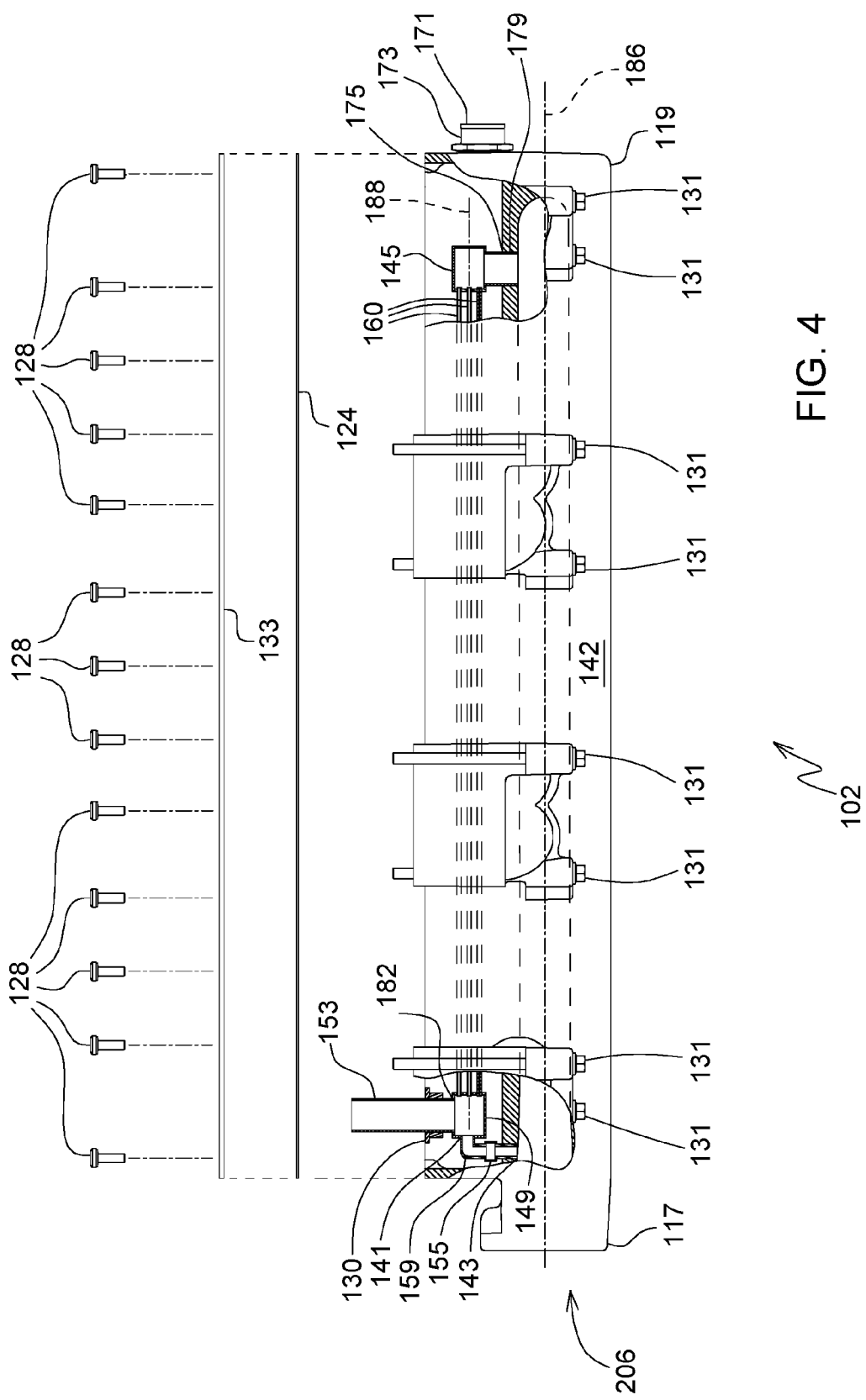
FIG. 4 is a bottom plan view of the exhaust manifold.
Figure 5:
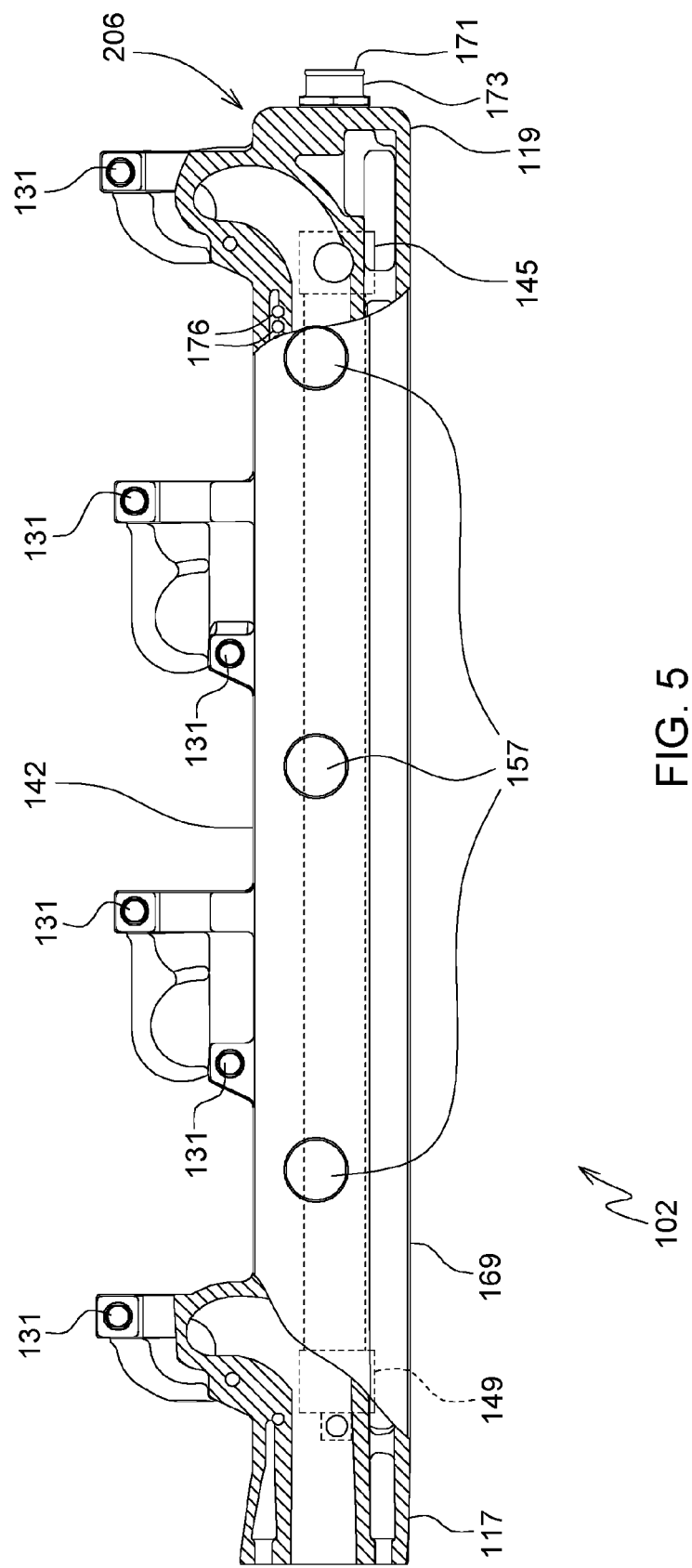
FIG. 5 is an alternate side elevation view of the exhaust manifold.
Figure 6:
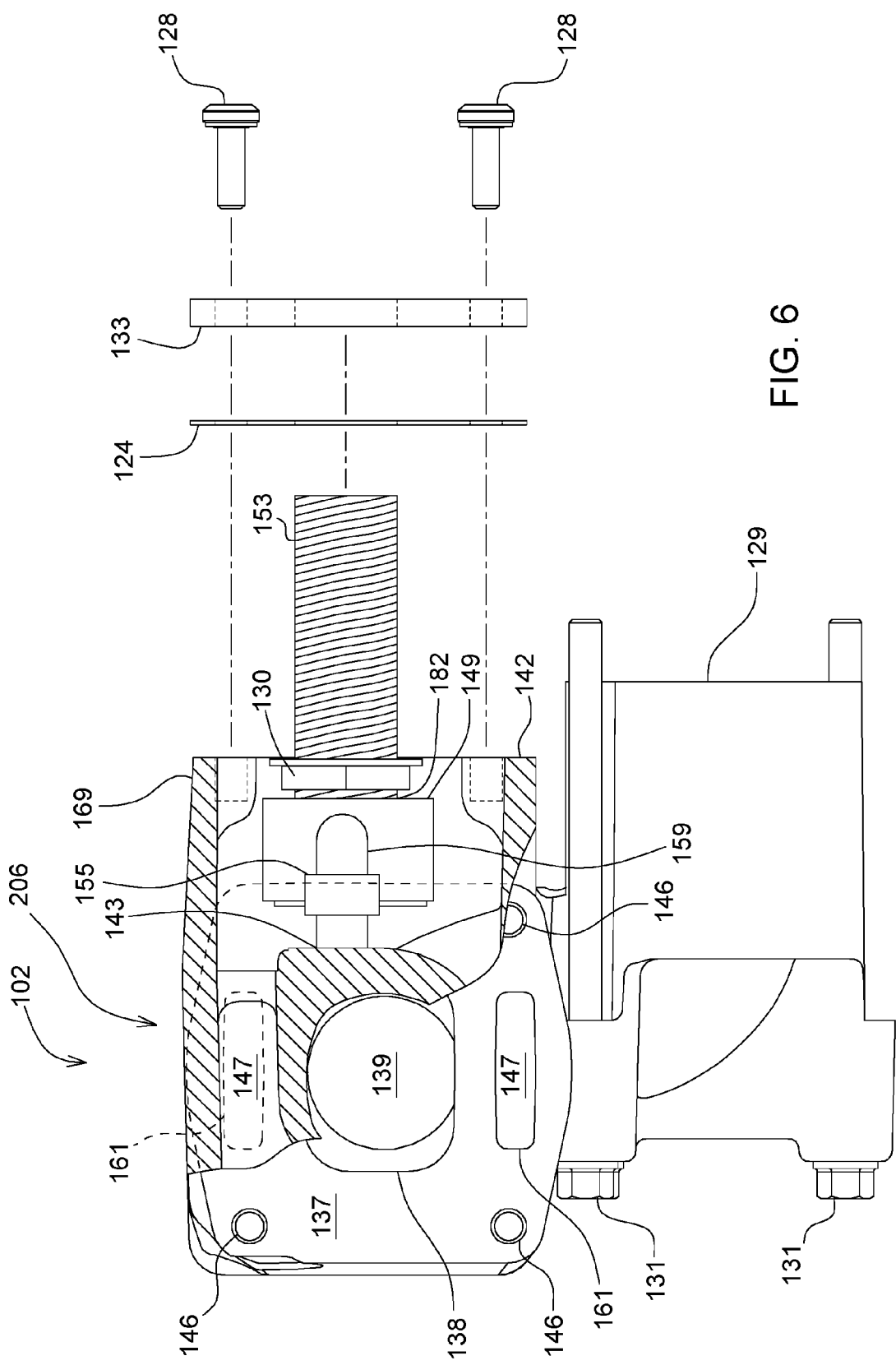
FIG. 6 is an elevation view of an end of the exhaust manifold, a portion of which is broken away.
Figure 7:
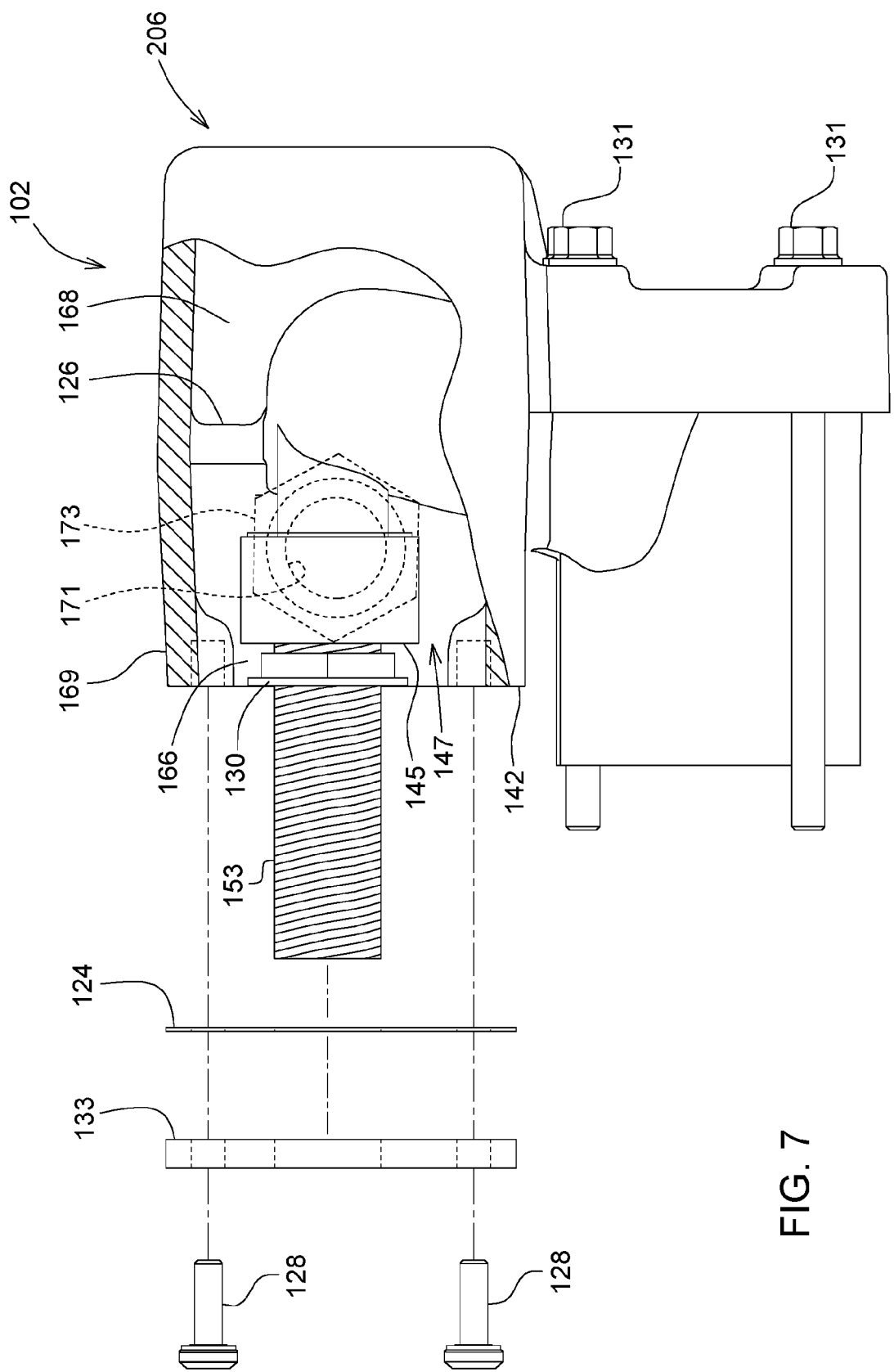
FIG. 7 is an elevation view of an opposite end of the exhaust manifold, a portion of which is broken away.

The power system 100 may also have, for example, a second turbocharger 109 that cooperates with the turbocharger 108 (i.e., series turbocharging). The second turbocharger 109 may be mounted to a mounting surface 137 (see FIG. 2) of the exhaust manifold 102 via a plurality of fasteners (not shown) that, for example, thread into a plurality of apertures 146. The second turbocharger 109 includes a second compressor 114, a second shaft (not shown), and a second turbine 113. The second compressor 114 may be a fixed geometry compressor, a variable geometry compressor, or any other type of compressor capable of receiving fresh intake gas, from upstream of the second compressor 114, and compressing the fresh intake gas to an elevated pressure level before it enters the engine 106.

The power system 100 may also have an EGR system 132 for receiving a recirculated portion of the exhaust gas, as indicated by directional arrow 194. The intake gas is indicated by directional arrow 190, and it is a combination of the fresh intake gas and the recirculated portion of the exhaust gas. The EGR system 132 has an EGR valve 122, a coolant passage 147, and an EGR mixer (not shown). The EGR valve 122 may be a vacuum controlled valve, allowing a specific amount of the recirculated portion of the exhaust gas back into the intake manifold. The coolant passage 147 cools the recirculated portion of the exhaust gas. Although the EGR valve 122 is illustrated as being downstream of the coolant passage 147, it could also be positioned upstream thereof.

The EGR mixer mixes the recirculated portion of the exhaust gas and the fresh intake gas into, as noted above, the intake gas. The recirculated exhaust gas travels in pulses correlating to the exhaust strokes of the cylinders (not shown) of the engine 106. So, if the engine 106 has, for example, four cylinders, then the recirculated exhaust gas travels in one pulse per every 180° of crank rotation. The fresh intake gas also travels in pulses, but these pulses correlate to, for example, the operation of the turbocharger 108, the second turbocharger 109, and the intake valves (not shown). This results in a flow of the pulses of the fresh intake gas at unique times and frequencies, relative to the pulses of the recirculated exhaust gas. As a result of all of this, the recirculated exhaust gas and fresh intake gas turbulently mix in the EGR mixer.

As further shown, the exhaust system 140 may include an aftertreatment system 120, and at least a portion of the exhaust gas passes therethrough. The aftertreatment system 120 removes various chemical compounds and particulate emissions present in the exhaust gas received from the engine 106. After being treated by the aftertreatment system 120, the exhaust gas is expelled into the atmosphere via a tailpipe 125.

The aftertreatment system 120 may include a $NO_x$ sensor 118, the $NO_x$ sensor 118 produces and transmits a $NO_x$ signal to the ECU 115 that is indicative of a $NO_x$ content of exhaust gas flowing thereby. The $NO_x$ sensor 118 may, for example, rely upon an electrochemical or catalytic reaction that generates a current, the magnitude of which is indicative of the $NO_x$ concentration of the exhaust gas.

The ECU 115 may have four primary functions: (1) converting analog sensor inputs to digital outputs, (2) performing mathematical computations for all fuel and other systems, (3) performing self diagnostics, and (4) storing information. The ECU 115 may, in response to the $NO_x$ signal, control a combustion temperature of the engine 106 and/or the amount of a reductant injected into the exhaust gas, so as to minimize the level of $NO_x$ entering the atmosphere.

The aftertreatment system 120 is shown having a diesel oxidation catalyst ("DOC") 163, a diesel particulate filter ("DPF") 164, and a selective catalytic reduction ("SCR") system 152, though the need for such components depends on the particular size and application of the power system 100. The SCR system 152 has a reductant delivery system 135, an SCR catalyst 170, and an ammonia oxidation catalyst ("AOC") 174. The exhaust gas may flow through the DOC 163, the DPF 164, the SCR catalyst 170, and the AOC 174, and is then, as just mentioned, expelled into the atmosphere via the tailpipe 125. In other words, in the embodiment shown, the DPF 164 is positioned downstream of the DOC 163, the SCR catalyst 170 downstream of the DPF 164, and the AOC 174 downstream of the SCR catalyst 170. The DOC 163, the DPF 164, the SCR catalyst 170, and the AOC 174 may be coupled together. Exhaust gas that is treated in the aftertreatment system 120 and released into the atmosphere contains significantly fewer pollutants—such as PM, $NO_x$, and hydrocarbons—than an untreated exhaust gas.

The DOC 163 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 163 may include, for example, a ceramic substrate, a metallic mesh, foam, or any other porous material known in the art, and the catalyst materials may be located on, for example, a substrate of the DOC 163. The DOC(s) may also oxidize NO contained in the exhaust gas, thereby converting it to $NO_2$ upstream of the SCR catalyst 170.

The DPF 164 may be any of various particulate filters known in the art that are capable of reducing PM concentrations (e.g., soot and ash) in the exhaust gas, so as to meet requisite emission standards. Any structure capable of removing PM from the exhaust gas of the engine 106 may be used. For example, the DPF 164 may include a wall-flow ceramic substrate having a honeycomb cross-section constructed of cordierite, silicon carbide, or other suitable material to remove the PM. The DPF 164 may be electrically coupled to a controller, such as the ECU 115, that controls various characteristics of the DPF 164.

If the DPF 164 were used alone, it would initially help in meeting the emission requirements, but would quickly fill up with soot and need to be replaced. Therefore, the DPF 164 is combined with the DOC 163, which helps extend the life of the DPF 164 through the process of regeneration. The ECU 115 may measure the PM build up, also known as filter loading, in the DPF 164, using a combination of algorithms and sensors. When filter loading occurs, the ECU 115 manages the initiation and duration of the regeneration process.

Moreover, the reductant delivery system 135 may include a reductant tank 101 for storing the reductant. One example of a reductant is a solution having 32.5% high purity urea and 67.5% deionized water (e.g., DEF), which decomposes as it travels through a decomposition tube 191 to produce ammonia. Such a reductant may begin to freeze at approximately 12 deg F. (−11 deg C.). If the reductant freezes when a machine is shut down, then the reductant may need to be thawed before the SCR system 152 can function.

The reductant delivery system 135 may include a reductant header 136 mounted to the reductant tank 101, the reductant header 136 further including, in some embodiments, a level sensor 104 for measuring a quantity of the reductant in the reductant tank 101. The level sensor 104 may include a float configured to float at a liquid/air surface interface of reductant included within the reductant tank 101. Other implementations of the level sensor 104 are possible, and may include, for example, one or more of the following: (1) using one or more ultrasonic sensors, (2) using one or more optical liquid-surface measurement sensors, (3) using one or more pressure sensors disposed within the reductant tank 101, and (4) using one or more capacitance sensors.

In the illustrated embodiment, the reductant header 136 includes a tank heating element 105 that receives coolant from the engine 106. The power system 100 includes a cooling system 103 having a reductant coolant supply passage 187, a reductant coolant return passage 193, an EGR coolant supply passage 202, and an EGR coolant return passage 204. The cooling system 103 may be an opened system or a closed system, depending on the specific application, while the coolant may be any form of engine coolant, including fresh water, sea water, an antifreeze mixture, and the like. If the engine 106 is a marine engine, for example, then the coolant may be used to keep the surface temperatures of the exhaust manifold 102 and the second turbocharger 109 below 220° C. (per SOLAS 2.2.6.1 regulation). By cooling the exhaust gas and the recirculated portion of the exhaust gas prior to leaving the exhaust manifold, costly cooling and insulating components are unnecessary (e.g., those positioned between the engine 106 and an EGR cooler). The exhaust manifold 102 may include a plurality of plugs 157 that are mounted so as to crack open if coolant freezes therein.

A first segment 196 of the reductant coolant supply passage 187 is positioned fluidly, between the engine 106 and the tank heating element 105, for supplying coolant to the tank heating element 130. The coolant circulates, through the tank heating element 130, so as to warm the reductant in the reductant tank 101, therefore reducing the risk that the reductant freezes therein and/or thawing the reductant upon startup. In an alternative embodiment, the tank heating element 105 may, instead, be an electrically resistive heating element. The EGR coolant supply passage 202 and the EGR coolant return passage 204 supply coolant to, and from, the exhaust manifold 102, respectively. A second segment 197 of the reductant coolant supply passage 187 is positioned fluidly between the tank heating element 105 and a reductant delivery mechanism 183 for supplying coolant thereto. The coolant heats the reductant delivery mechanism 183, reducing the risk that reductant freezes therein.

A first segment 198 of the reductant coolant return passage 193 is positioned between the reductant delivery mechanism 183 and the tank heating element 130, and a second segment 199 of the reductant coolant return passage 193 is positioned between the engine 106 and the tank heating element 130. The first segment 198 and the second segment 199 return the coolant to the engine 106.

The decomposition tube 191 may be positioned downstream of the reductant delivery mechanism 183 but upstream of the SCR catalyst 170. The reductant delivery mechanism 183 may be, for example, an injector that is selectively controllable to inject reductant directly into the exhaust gas. As shown, the SCR system 152 may include a reductant mixer 172 that is positioned upstream of the SCR catalyst 170 and downstream of the reductant delivery mechanism 183.

The reductant delivery system 135 may additionally include a reductant pressure source (not shown) and a reductant extraction passage 184. The reductant extraction passage 184 may be coupled fluidly to the reductant tank 101 and the reductant pressure source therebetween. Although the reductant extraction passage 184 is shown extending into the reductant tank 101, in other embodiments, the reductant extraction passage 184 may be coupled to an extraction tube via the reductant header 136. The reductant delivery system 135 may further include a reductant supply module 110, such as a Bosch reductant supply module (e.g., the Bosch Denoxtronic 2.2—Urea Dosing System for SCR Systems).

The reductant delivery system 135 may also include a reductant dosing passage 185 and a reductant return passage 195. The reductant return passage 195 is shown extending into the reductant tank 101, though in some embodiments of the power system 100, the reductant return passage 195 may be coupled to a return tube via the reductant header 136. And the reductant delivery system 135 may have—among other things—valves, orifices, sensors, and pumps positioned in the reductant extraction passage 184, reductant dosing passage 185, and reductant return passage 195.

As mentioned above, one example of a reductant is a solution having 32.5% high purity urea and 67.5% deionized water (e.g., DEF), which decomposes as it travels through the decomposition tube 191 to produce ammonia. The ammonia reacts with $NO_x$ in the presence of the SCR catalyst 170, and it reduces the $NO_x$ to less harmful emissions, such as $N_2$ and $H_2O$. The SCR catalyst 170 may be any of various catalysts known in the art. For example, in some embodiments, the SCR catalyst 170 may be a vanadium-based catalyst. But in other embodiments, the SCR catalyst 170 may be a zeolite-based catalyst, such as a Cu-zeolite or a Fe-zeolite. The AOC 174 may be any of various flowthrough catalysts for reacting with ammonia and thereby produce nitrogen. Generally, the AOC 174 is utilized to remove ammonia that has slipped through or exited the SCR catalyst 170. As shown, the AOC 174 and the SCR catalyst 170 may be positioned within the same housing, but in other embodiments, they may be separate from one another.

Referring to FIGS. 2-7, the exhaust manifold 102 is shown as having an exhaust gas passage 139, an EGR passage 151, and a coolant passage 147. The exhaust gas passage 139 extends fluidly between an exhaust gas inlet 148 and an exhaust gas outlet 138 positioned downstream thereof, and it allows exhaust gas to pass therethrough. The exhaust manifold 102 includes a main housing 206 and a plurality of exhaust gas inlet ducts 127 that extend away from the main housing 206.

The EGR passage 151 extends fluidly between an EGR inlet 179 and an EGR outlet 182 positioned downstream thereof, and it allows a recirculated portion of the exhaust gas to pass therethrough. The EGR passage 151 is defined by a casting that forms the exhaust manifold 102, while the EGR inlet 179 is defined by the exhaust gas passage 139.

As shown, the coolant passage 147 extends fluidly between a coolant inlet 161 and a coolant outlet 171 positioned downstream thereof. Exemplarily, a fitting 173 may form the coolant outlet 171. The temperatures of the exhaust gas and the recirculated portion of the exhaust gas are typically very high, which may cause the exhaust manifold 102 to reach high temperatures. To avoid such high temperatures, the coolant passage 147 overlaps the exhaust gas passage 139 and the EGR passage 151. And as a result of such positioning, the exhaust gas passage 139 cools the exhaust gas, while the EGR passage 151 cools the recirculated portion of the exhaust gas.

In contrast, EGR coolers, as used in some power systems, experience thermal cycling as an EGR valve opens and closes, resulting in significant stresses on the EGR cooler and its components. However, as shown in the illustrated power system 100, by co-locating the exhaust gas passage 139, the EGR passage 151, and a coolant passage 147, an EGR cooler is unnecessary and its associated thermal cycling issues are avoided. This is because the exhaust gas and the recirculated portion of the exhaust gas continuously (rather than cyclically) flow through the exhaust manifold 102.

An exhaust gas inlet duct 158, which may be one of a plurality of exhaust gas inlet ducts 127, extends fluidly between a duct inlet 180 and a duct outlet 181 positioned downstream thereof. Mounting flanges 129 may extend from each of the plurality of exhaust gas inlet ducts 127, the mounting flanges 129 being positioned so as to mount to the engine 106 and be retained via a plurality of fasteners 131 that are positioned in a plurality of apertures 154. The duct outlet 181 is positioned upstream of the exhaust gas passage 139 and upstream of the EGR passage 151, and it directs a portion of the exhaust gas towards the EGR passage 151 so that the portion of the exhaust gas becomes the recirculated portion of the exhaust gas.

The exhaust gas and the recirculated portion of the exhaust gas flow towards a first end 117 of the exhaust manifold 102, and in contrast, the coolant flows towards a second end 119. As illustrated, the first end 117 and the second end 119 are positioned on opposite longitudinal ends relative to one another.

The EGR passage 151 includes a plurality of EGR passage portions 160 extending parallel relative to one another. The coolant passage 147 surrounds the plurality of EGR passage portions 160 so as to cool the plurality of EGR passage portions 160 via the coolant, and the plurality of EGR passage portions 160 cool the recirculated portion of the exhaust gas. A plurality of mounting brackets 123 are positioned about the plurality of EGR passage portions 160 for positioning the plurality of EGR passage portions 160. The plurality of EGR passage portions 160 may comprise any number of EGR passage portions, the exact number depending on the specific application.

A cover 133 may be mounted to the exhaust manifold 102 and retained thereto via a plurality of fasteners 128 that are threaded into a plurality of blind apertures 177. A gasket 124 may be sandwiched between the exhaust manifold 102 and a cover 133.

The exhaust manifold 102 further includes an EGR inlet manifold 145 and an EGR outlet manifold 149 positioned downstream thereof. The plurality of EGR passage portions 160 are positioned fluidly between the EGR inlet manifold 145 and the EGR outlet manifold 149. The EGR inlet manifold 145 splits the recirculated portion of the exhaust gas entering the plurality of EGR passage portions 160. An EGR inlet tube 175 may extend away from the EGR inlet manifold 145 and provide the recirculated portion of the exhaust gas thereto. The EGR outlet manifold 149 recombines the recirculated portion of the exhaust gas exiting the plurality of EGR passage portions 160 and directs the recirculated portion of the exhaust gas to an intake manifold of the engine 106.

A bleed passage 159 extends fluidly between a bleed inlet 141, as defined by the EGR passage 151, and a bleed outlet 143, as defined by the exhaust gas passage 139. The bleed passage 159 is provides a periodic passage for a part of the recirculated portion of the exhaust gas to bleed and rejoin the exhaust gas. The EGR outlet manifold 149 is defined by the bleed inlet 141. An EGR outlet tube 153 may extend away from the EGR outlet manifold 149 and through the cover 133. A crimp connector 167, a nut with a gasket sealing face 144, and a crimp ring 150 positioned therebetween may be coupled to an end of the EGR outlet tube 153. A check valve 155 may be positioned in the bleed passage 159. In operation, when the check valve 155 reaches a bleed pressure, it opens towards the exhaust gas passage 139 and away from the EGR passage 151. In other embodiments, the bleed passage 159 may comprise an orifice (not shown), rather than the check valve 155.

As shown, the coolant passage 147 may have a first coolant portion 166, a second coolant portion 168, and a plurality of connecting passages 165 positioned fluidly therebetween. The first coolant portion 166 overlaps the EGR passage 151, while the second coolant portion 168 overlaps the exhaust gas passage 139. The first coolant portion 166 is positioned upstream of the second coolant portion 168 and surrounds the EGR passage 151. As illustrated, the plurality of connecting passages 165 has a first set of passages 162 and a second set of passages 176. The first set of passages 162 overlaps a top wall 169 of the exhaust manifold 102 and is positioned above the exhaust gas passage 139 and the EGR passage 151. But in contrast, the second set of passages 176 overlaps a bottom wall 142 of the exhaust manifold 102 and is positioned below the exhaust gas passage 139 and the EGR passage 151.

The first set of passages 162 is positioned perpendicularly relative to a longitudinal axis 186 of the exhaust gas passage 139 and a longitudinal axis 188 of the EGR passage 151. And the second set of passages 176 is positioned perpendicularly relative to the longitudinal axis 186 of the exhaust gas passage 139 and the longitudinal axis 188 of the EGR passage 151. The longitudinal axis 186 of the exhaust gas passage 139 is positioned in parallel to a longitudinal axis 188 of the EGR passage 151.

As illustrated, the exhaust manifold 102 may comprise an internal wall 126 that defines a portion of the coolant passage 147. The first coolant portion 166 is positioned on a first side of the internal wall 126, and the second coolant portion 168 is positioned on a second side.

While the disclosure has been illustrated and described in detail in the drawings and foregoing description, such illustration and description is to be considered as and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An exhaust manifold, comprising:
   a main housing;
   a plurality of exhaust gas inlet ducts, each exhaust gas inlet duct extending fluidly between a duct inlet and a duct outlet positioned downstream thereof, each exhaust gas inlet duct extending away from the main housing, each exhaust gas inlet duct comprising a mounting flange configured to mount to an internal combustion engine;
   an exhaust gas passage disposed in the main housing and extending fluidly between an exhaust gas inlet and an exhaust gas outlet positioned downstream thereof, the exhaust gas passage configured to allow exhaust gas, from the engine, to pass therethrough;

an exhaust gas recirculation ("EGR") passage disposed in the main housing and extending fluidly between an EGR inlet and an EGR outlet positioned downstream thereof, the EGR inlet being defined by the exhaust gas passage, the EGR passage configured to allow a recirculated portion of the exhaust gas to pass therethrough and back to an internal combustion engine, the exhaust gas outlet being positioned only downstream of the engine and configured to allow an entire remaining portion of the exhaust gas to pass therethrough and out of the engine; and a coolant passage disposed in the main housing and extending fluidly between a coolant inlet and a coolant outlet positioned downstream thereof, the coolant passage configured to cool the exhaust gas passage and the EGR passage via a coolant, the exhaust gas passage configured to cool the exhaust gas, the EGR passage configured to cool the recirculated portion of the exhaust gas.

2. The exhaust manifold of claim 1, wherein the coolant is an engine coolant used in a closed cooling system.

3. The exhaust manifold of claim 1, wherein a longitudinal axis of the exhaust gas passage is positioned in parallel to a longitudinal axis of the EGR passage.

4. The exhaust manifold of claim 1, wherein the exhaust gas and the recirculated portion of the exhaust gas flows towards a first end of the exhaust manifold, the coolant flows towards a second end of the exhaust manifold, the first end and the second end are positioned on opposite longitudinal ends relative to one another.

5. The exhaust manifold of claim 1, wherein the EGR passage comprises a plurality of EGR passage portions extending parallel relative to one another, the coolant passage surrounding the plurality of EGR passage portions so as to cool the plurality of EGR passage portions via the coolant, and the plurality of EGR passage portions are configured to cool the recirculated portion of the exhaust gas.

6. The exhaust manifold of claim 5, further comprising a plurality of mounting brackets disposed in the main housing and positioned about the plurality of EGR passage portions and configured to stabilize the plurality of EGR passage portions.

7. The exhaust manifold of claim 5, further comprising an EGR inlet manifold and an EGR outlet manifold positioned downstream thereof, the plurality of EGR passage portions positioned fluidly between the EGR inlet manifold and the EGR outlet manifold, the EGR inlet manifold configured to split the recirculated portion of the exhaust gas entering the plurality of EGR passage portions therebetween, and the EGR outlet manifold configured to recombine the recirculated portion of the exhaust gas exiting the plurality of EGR passage portions and configured to direct the recirculated portion of the exhaust gas to an intake manifold of the internal combustion engine.

8. The exhaust manifold of claim 7, further comprising a bleed passage disposed in the main housing and extending fluidly between a bleed inlet and a bleed outlet, the bleed inlet being defined by the EGR passage, the bleed outlet being positioned downstream of the bleed inlet and defined by the exhaust gas passage, the bleed passage configured to provide a periodic passage for a part of the recirculated portion of the exhaust gas to bleed and rejoin the exhaust gas, the EGR outlet manifold defining the bleed inlet.

9. The exhaust manifold of claim 1, further comprising a bleed passage disposed in the main housing and extending fluidly between a bleed inlet and a bleed outlet, the bleed inlet being defined by the EGR passage, the bleed outlet being positioned downstream of the bleed inlet and defined by the exhaust gas passage, the bleed passage configured to provide a periodic passage for a part of the recirculated portion of the exhaust gas to bleed and rejoin the exhaust gas.

10. The exhaust manifold of claim 9, further comprising a check valve positioned in the bleed passage, the check valve being configured to open towards the exhaust gas passage, and away from the EGR passage, upon reaching a bleed pressure.

11. The exhaust manifold of claim 9, wherein the bleed passage comprises an orifice.

12. The exhaust manifold of claim 1, wherein the coolant passage comprises a first coolant portion and a second coolant portion and a plurality of connecting passages positioned fluidly therebetween.

13. The exhaust manifold of claim 12, wherein the first coolant portion surrounds the EGR passage.

14. The exhaust manifold of claim 12, wherein the plurality of connecting passages comprises a first set of passages and a second set of passages, the first set of passages is positioned above the exhaust gas passage and the EGR passage, and the second set of passages is positioned below the exhaust gas passage and the EGR passage.

15. The exhaust manifold of claim 14, wherein the first set of passages is positioned perpendicularly relative to a longitudinal axis of the exhaust gas passage and a longitudinal axis of the EGR passage, and the second set of passages is positioned perpendicularly relative to the longitudinal axis of the exhaust gas passage and the longitudinal axis of the EGR passage.

16. The exhaust manifold of claim 12, further comprising an internal wall, the first coolant portion positioned on a first side of the internal wall, the second coolant portion positioned on a second side of the internal wall, the internal wall defining the coolant passage.

17. An exhaust manifold, comprising:
a main housing;
an exhaust gas passage disposed in the main housing and extending fluidly between an exhaust gas inlet and an exhaust gas outlet positioned downstream thereof, the exhaust gas passage being configured to allow exhaust gas from an internal combustion engine to pass therethrough, the exhaust gas outlet being positioned only downstream of the engine;
an exhaust gas recirculation ("EGR") passage disposed in the main housing and extending fluidly between an EGR inlet and an EGR outlet positioned downstream thereof, the EGR inlet being defined by the exhaust gas passage, the EGR passage configured to allow a recirculated portion of the exhaust gas to pass therethrough and back to the internal combustion engine; and
a bleed passage extending fluidly between a bleed inlet and a bleed outlet, the bleed inlet being defined by the EGR passage, the bleed outlet being positioned downstream of the bleed inlet and defined by the exhaust gas passage, the bleed passage configured to provide a periodic passage for a part of the recirculated portion of the exhaust gas to bleed and rejoin the exhaust gas.

* * * * *